April 9, 1968     J. F. SHERWOOD ETAL     3,376,631
METHOD OF MAKING A THERMALLY RESPONSIVE DEVICE
Filed July 12, 1965
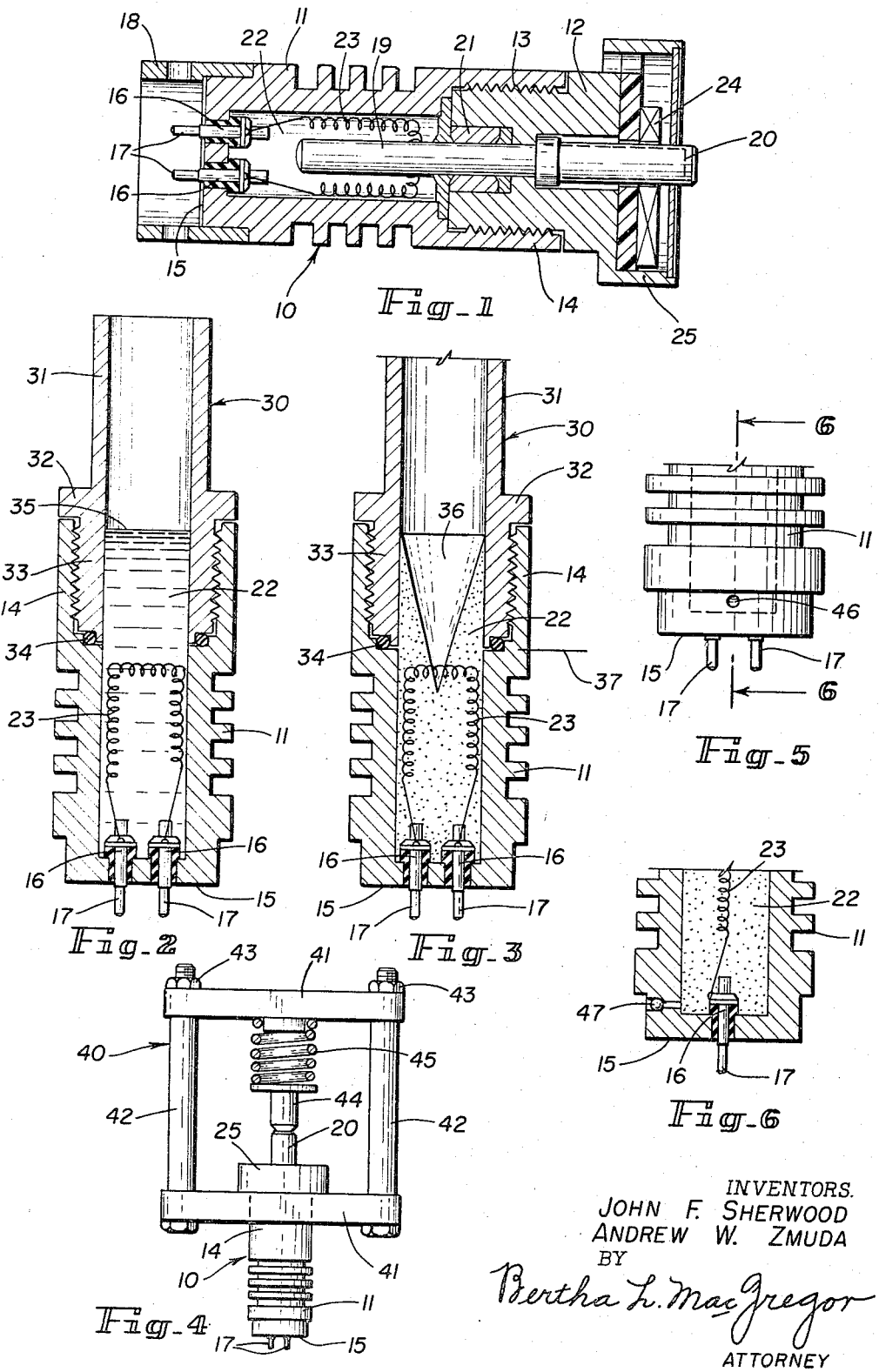
INVENTORS.
JOHN F. SHERWOOD
ANDREW W. ZMUDA
BY
Bertha L. MacGregor
ATTORNEY

3,376,631
METHOD OF MAKING A THERMALLY RESPONSIVE DEVICE

John F. Sherwood, Wheat Ridge, and Andrew W. Zmuda, Denver, Colo., assignors, by direct and mesne assignments, to Thermal Hydraulics Corporation, a corporation of California
Filed July 12, 1965, Ser. No. 471,119
9 Claims. (Cl. 29—405)

This invention relates to an improved process of producing thermal motors, particularly motors of the type which employ expansible and contractible material capable of actuating a piston shaft when the material is encased in a high pressure chamber and heated. An example of such thermal motors is shown and described in U.S. Patent No. 3,029,595 issued to John F. Sherwood, wherein wax or other thermally responsive material is employed for actuating the piston shaft. Such materials are referred to herein as the "fill" compound.

We have observed that when the fill compound cools, after the filling operation, fine cracks or voids appear and that these vary in different motors. Because of the presence of these voids or cracks which varies the total fill from one motor to another, large variation in response time occurs. This presents a serious problem because uniformity in response time of thermal motors produced by a manufacturer is essential to commercial acceptance of the product.

Fill compounds now in use also have some solid state expansion which varies with the ambient temperature in which the motor is operating. Because of the solid state expansion, the total fill in the motor will be different for each ambient temperature in which the motor may operate. This difference in fill due to solid state expansion has a pronounced effect on the retraction time of the motor.

Therefore the main objects of our invention are to obtain uniformity in response time and maximum uniformity in motor retraction time in thermal motors produced by our improved method, whereby all voids in the final solid fill are eliminated, and solid state expansion as affecting motor retraction time for a specific ambient temperature in which the motor may be required to operate is minimized.

The objects and advantages of our process of producing thermal motors will be apparent from the drawings and following specification.

In the drawings:

FIG. 1 is a longitudinal sectional view of an electric thermal motor produced by the process of this invention.

FIG. 2 is a longitudinal sectional view of part of the thermal motor of FIG. 1 and of an adapter connected temporarily to the motor housing during part of the process of manufacture.

FIG. 3 is a view similar to FIG. 2 illustrating a subsequent step in the process.

FIG. 4 is an elevational view of the thermal motor on a reduced scale and of apparatus for placing the motor shaft under pressure during the process of manufacture.

FIG. 5 is an elevational view of part of the thermal motor housing showing a hole drilled therethrough for extrusion of "fill" material.

FIG. 6 is a sectional view in the plane of the line 6—6 of FIG. 5 showing the drilled hole closed.

In that embodiment of the invention shown in the drawings, the thermal motor 10 comprises a high pressure housing 11, usually cylindrical in cross section, closed at one end by a shaft bearing block 12 provided with external threads 13 for engaging the internally threaded sleeve portion 14 of the housing 11. The opposite end of the housing 11 is closed by an integrally formed wall 15 in which are mounted electrodes 16. Electrical leads 17 pass through openings in an end sleeve 18 press fiitted on the housing 11. A piston shaft 19 having a work engaging outer end 20 is mounted in bearings 21 in the bearing block 12, with the piston and extending into a high pressure chamber 22. The chamber 22 contains an electrical heating element 23 and is completely filled with material such as paraffin or other wax or other suitable expansible and contractible material capable of actuating the shaft 19 by thermal expansion of the compound. An electrical switch 24 is shown diagrammatically in FIG. 1, within an end cap 25 through which extends the work engaging end 20 of the shaft.

FIG. 1 shows the thermal motor in its completed, assembled form. Before the parts are assembled, the following described steps in the manufacturing process are performed for the purpose of eliminating all voids in the final solid "fill" and also to eliminate solid state expansion as an after effect on motor retraction time for the ambient temperature under which the motor may be required to operate.

As shown in FIG. 2, the housing 11, with only the heating element 23 and electrodes 17 mounted in the closed end 15, has an adapter 30 mounted in the open end of said housing 11. The adapter comprises a tubular body 31 provided with an annular flange 32 adapted to bear on the flat end surfaces of the part 14 of the housing 11, and an externally screw threaded sleeve 33 which engages the threads 13 of the housing member 14. An O-ring 34 is located between the housing 11 and adapter 30. The adapter permits the filling of the housing 11 to the top of the sleeve portion 14 with the chosen fill material, as indicated at 35 in FIG. 2. The wax or other fill material is in its expanded liquid state.

Next, the filled housings 11 with the adapters 30 still connected thereto are placed in a vacuum oven which is maintained at a temperature slightly above the melting point of the fill compound, thereby maintaining the material in a liquid state in a highly evacuated chamber. The material in the liquid state is evacuated for a period of time sufficient to remove as much as is practical all dissolved air and gases from the fill compound and chamber.

After the air evacuating step has been completed, the housings 11 with the adapters 30 connected thereto are placed on a special cooling plate to obtain controlled cooling and to cause the material to solidify with a definite central void as indicated at 36 in FIG. 3.

The adapters 30 next are removed and the excess fill material is trimmed away flush with the top of the housing chamber 22 at the level indicated by the line 37. Next a switch housing assembly 24 and the piston shaft 19–20 are mounted in the housing 11, with the piston shaft inserted into the chamber 22 and the free end 20 of the shaft protruding through the seal cap 25. The piston shaft 19–20 is then removed and the housing and contents are placed in an evacuation chamber designed so that a piston assembly can be installed in the housing while the thermal motor is in the evacuated chamber at 29 plus inches of Hg.

The thermal motors are next placed in a fixture shown in FIG. 4 for the purpose of applying pressure of a 250 lb. or more load to the piston of each motor. This fixture comprises a frame 40 consisting of upper and lower cross members 41 and side members 42 adjusted by screw nuts 43 to hold the cross pieces 41 in desired positions. The housing 11 with end seal cap 25 mounted thereon is placed in the fixture with the cap 25 bearing on the lower cross piece 41, the end 20 of the piston shaft protruding above the cap 25. A pressure exerting member 44 and spring 45 mounted between the upper cross bar 41 and the shaft 20 impose the selected load on the shaft 20, as shown in FIG. 4.

The motors in the fixtures are then placed in an oven and brought to a temperature sufficiently high to cause the fill compound to become pliable. The motors soak at this temperature for approximately two hours. The time and temperature varies depending upon the melting point of the compound and design of the thermal motor. When the compound is pliable it is easily formed and moved around by the high internal pressure of approximately 9000 lbs. per sq. inch, created by the 250-lb. or more load at the end of a 3/16-inch diameter piston shaft. This process ensures that all voids and fissures in the compound closed and that the compound forms a dense solid fill. The motors are now allowed to cool to room temperature while still remaining under the load in the fixtures. When these are cooled, the motors, still in the fixtures under the load, are placed in a drill fixture where a small hole 46 is drilled through the side of the housing 11 at the end of the chamber 22, as shown in FIG. 5.

The drilled motors, with their piston shafts still under load in the fixtures, are now ready for final calibration, having regard for the fact that the motors may be required to operate at different ambient temperatures. The motors are placed in an oven, at temperature set for the maximum ambient temperature in which the motors will be required to operate. The motors are allowed to soak in the oven at the selected temperature for a time sufficient to assure complete extrusion of surplus compound. As the motors become heated to oven temperature, the compound becomes plastic and the high internal pressure caused by the 250-lb. load on the piston readily extrudes the excess compound through the small drilled hole 46. The material has come to the solid state expansion at the oven temperature and the expanded amount at this temperature is also extruded as excess compound through the hole 46. At the completion of the extrusion, the drilled hole 46 is sealed off to be pressure tight. This may be achieved by pounding a small ball 47 into the hole 46 as shown in FIG. 6.

Motors produced by the described process function uniformly with respect to heat-response time and shaft-retraction time after termination of the heat application.

A load of at least 250 lbs. is imposed on the shaft 19–20 by the fixture 40 of FIG. 4. This load was chosen because the thermal motors of our invention are designed to perform work loads of at least 250 lbs. If motors produced by our manufacturing process are designed to perform heavier work loads, then the load imposed by the fixture 40 on the piston shafts will be increased accordingly, so that the motor shafts will have been subjected to load pressure in the fixture 40 at least as great as the work load under which the motors are expected to function.

We claim:
1. In a process of producing a thermal motor having a housing, a high pressure chamber in the housing, degassed expansible and contractible fill material in the chamber, means for heating the material, and a piston shaft having one end embedded in the material and the other end protruding from the housing, the improvement which comprises
  (a) applying a load not less than the work load to be performed by said motor on the protruding piston shaft while the housing and contents are subjected to temperature which makes the fill material pliable and to close all cracks and voids therein,
  (b) cooling the housing and contents to room temperature while maintaining the piston shaft under said load,
  (c) forming a small hole through the housing communicating with the high pressure chamber,
  (d) heating the housing and contents to the ambient temperature at which the motor is designed to operate while the shaft is maintained under said load for a time sufficient to cause complete extrusion of excess compound through the hole, and
  (e) sealing the hole and making the housing pressure tight.
2. The process defined by claim 1, in which the load applied to the protruding piston shaft is not less than 250 lbs.
3. The process defined by claim 1, in which the heating of the housing and contents to the ambient temperature at which the motor is designed to operate is maintained for approximately two hours.
4. The process of producing a thermal motor having a housing, a high pressure chamber in the housing, expansible and contractible material in the chamber, means for heating the material, and a piston shaft having one end embedded in the material and the other end protruding from the housing, said process comprising
  (a) subjecting a housing filled with the material to temperature slightly above the melting point of the material in a vacuum oven and removing air and gases from the housing and material therein,
  (b) cooling the housing and material to solidify the material with formation of a central void,
  (c) trimming the excess material to a level flush with the top of the high pressure chamber in the housing,
  (d) placing the housing and fill material in an evacuation chamber and installing an end seal on the housing and a piston shaft in the chamber with one end protruding through the end seal,
  (e) applying a load approximately equal to the work load for which the motor is designed on the protruding piston shaft while the the housing, material and shaft are subjected to temperature which makes the material pliable,
  (f) cooling the housing and contents to room temperature while maintaining the shaft under said load,
  (g) forming a small hole through the housing communicating with the chamber,
  (h) heating the housing and contents while under said load to the ambient temperature at which the motor is intended to operate and maintaining said heat to cause complete extrusions through said hole of excess compound, and
  (i) sealing the hole to make the housing pressure tight.
5. The process defined by claim 4, in which the load applied to the piston shaft is not less than 250 lbs.
6. The process defined by claim 4, in which the heating of the housing and contents while under said load to the ambient temperature at which the motor is intended to operate is maintained for approximately two hours.
7. The process defined by claim 4, in which the end seal and piston shaft are installed in the housing while the housing and fill material are in the evacuation chamber at 29 plus inches of Hg.
8. The process defined by claim 4, in which the load approximately equal to the work load for which the motor is designed is applied to the protruding piston shaft by placing the housing and contents in a fixture having upper and lower cross pieces in which the housing end cap bears on one of the cross pieces and the other cross piece bears yieldingly and adjustably on the piston shaft.

9. The process defined by claim 4, in which the excess compound extruded through said hole includes the surplus produced by expansion due to heating to the ambient temperature and due to solid state expansion of the compound.

References Cited

UNITED STATES PATENTS

| | | | |
|---|---|---|---|
| 2,714,759 | 8/1955 | Von Wangenheim | 73 |
| 2,806,376 | 9/1957 | Wood | 73 |
| 3,029,595 | 4/1962 | Sherwood | 60—23 |
| 3,034,207 | 5/1962 | Spase | 29—405 |
| 3,166,893 | 1/1965 | Sherwood | 60—23 |

JOHN F. CAMPBELL, *Primary Examiner.*

D. C. REILEY, *Assistant Examiner.*